United States Patent Office 2,839,589
Patented June 17, 1958

2,839,589

CHLORINATION PROCESS

David Brown, New York, N. Y., assignor to Chempatents, Inc., New York, N. Y., a corporation of Delaware No Drawing. Application November 22, 1954
Serial No. 470,513

3 Claims. (Cl. 260—654)

This invention relates to processes for the chlorination of aliphatic hydrocarbons, more particularly to processes for making perchlorethylene and carbon tetrachloride by the thermal chlorination of aliphatic hydrocarbons and their partially chlorinated derivatives, and it relates especially to such processes wherein the reaction mixture is rapidly preheated substantially up to reaction temperature.

Perchlorethylene and carbon tetrachloride have achieved considerable commercial success. They may be prepared by the direct thermal chlorination of aliphatic hydrocarbons having about 1 to 4 or more carbon atoms in the molecule, the general preference being 1 to 3 carbon atoms. The chlorination reaction is carried out at relatively high temperatures of the order of about 500 to 700° C. or higher, the general preference being temperatures of about 550 to 650° C. The desired product and hydrogen chloride side product may be recovered by fractionation.

A major problem confronted by the art in connection with the preparation of chlorinated hydrocarbons of the above type is the obtention of relatively high yields of substantially pure products with minimum formation of undesirable by-products.

The discoveries associated with the invention and related to the solution of the above problems, and objects achieved in accordance with the invention include the following: the provision of a process for preparing perchloroethylene or carbon tetrachloride by the thermal chlorination of aliphatic hydrocarbons having 1 to 4 carbon atoms in the molecule or their partially chlorinated derivatives or both wherein the reactant mixture is rapidly preheated substantially to reaction temperature, then reacted, and the desired product or products recovered; the provision of such a process wherein the reaction mixture includes a high proportion of hydrogen chloride as a diluent and this is heated before blending with the raw feed, whereby the reaction mixture is preheated; the provision of such a process wherein the reaction mixture includes a high proportion of carbon tetrachloride or perchlorethylene as a diluent, and this is preheated prior to blending with the raw feed, whereby the reaction mixture is preheated; the provision of such a process wherein part of the hot reacted mixture is blended with the raw feed, whereby the newly formed reaction mixture is preheated; and other objects which will be apparent as details or embodiments of the invention are set forth hereinafter.

In order to facilitate a clear understanding of the invention, the following preferred specific embodiments are described in detail.

Example 1

A reaction mixture of 1 mol of methane, 5 mols of chlorine and 9 mols of carbon tetrachloride is made up, using carbon tetrachloride which is at a temperature in the range of about 500 to 700° C. whereby the chlorine and methane are rapidly preheated, and passed into a reactor maintained at reaction temperature in the range of about 500 to 700° C. Under these conditions, smooth and rapid reaction occurs. Perchlorethylene is obtained at a yield of 96% or more of theoretical, based on methane, with substantially no formation of undesirable by-products.

If the same operation is conducted without the preheating and with low proportions of diluent carbon tetrachloride, the reaction is difficult to initiate, explosion easily occurs during initiation, and considerable carbon or other solid substances are formed, resulting in low yields (60 to 70%). Recovery of the desired product in pure form is especially difficult.

Example 2

The procedure of Example 1 is followed, except that the reaction mixture contains about 1 mol of methane, 3.3 mols of chlorine, 2.4 mols of carbon tetrachloride, and about 10 mols of hydrogen chloride (the latter being the major diluent). The hydrogen chloride is heated to about 500 to 700° C. just prior to mixing with the other reactants, whereby the reaction mixture is preheated substantially to reaction temperature. The results obtained are substantially analogous to those in Example 1; however, preheating hydrogen chloride diluent rather than carbon tetrachloride is preferred from an operational viewpoint since it may be carried out in ordinary steel equipment without undue corrosion.

If no carbon tetrachloride diluent is employed in the foregoing, a substantial amount thereof is formed in the reaction step.

Example 3

The procedure of Example 2 is followed except that the reaction mixture contains 1 mol of propane, about 7.5 mols of chlorine, about 2.2 mols of carbon tetrachloride and about 20 to 60 mols of hydrogen chloride, and comparable results are obtained.

Example 4

The procedure of Example 2 is followed except that the reaction mixture contains about 1 mol of methane, about 3.9 mols of chlorine, about 7.2 mols of carbon tetrachloride, and about 8 mols of hydrogen chloride, this mixture being formed by blending about two volumes of hot reacted gas mixture with about one volume of new feed made up of 1 mol of methane, 3.3 mols of chlorine and 2.4 mols of carbon tetrachloride; and comparable results are obtained.

Example 5

The procedure of Example 4 is repeated, except that the reaction mixture is made up of about three volumes of hot reacted gases with about one volume of new feed, and comparable results are obtained.

Example 6

The procedure of Example 4 is repeated, except that the reaction mixture is made up of about four volumes of hot reacted gases with about one volume of new feed, and comparable results are obtained.

The mixing of the hot reacted gases with the new feed may be carried out in any convenient manner, e. g. by means of mechanical circulation such as with a fan. It is possible, however, to employ a Venturi mixing device activated by the pressure drop of the new feed gases to aspirate hot reacted gases to form the reaction mixture.

Generally, the reactor may be made of corrosion resistant material such as stoneware, or corrosion resistant metal, or it may be carbon lined. A Venturi device may be set vertically in a vertical cylindrical reactor and arranged so that new feed is blended with hot gas at the bottom thereof, the mixture passed up through the Venturi and then down in the space around the Venturi, a part of the resulting reacted gases being removed for recovery of product or products, and another part being blended with new feed. This space may be packed if desired, e. g. with rings, saddles, pellets or similar refractory particles. If desired, the packing may be coated with a catalyst, such as a metal salt.

Comparable results to the foregoing are achieved with various modifications thereof, including the following. The preheating of the gaseous mixture may be to a temperature of the order of about 450 to 500° C. or more, the reaction temperature being in the range of about 500 to 700° C., preferably 550 to 650° C. If desired, the reacted mixture may be quenched prior to the recovery of the desired product or products.

Where a part of the hot reacted gases are blended with the new feed, the volume ratio thereof may be in the range of about 1:1 to 1:6 or more relative to the new feed. The carbon tetrachloride to methane ratio may be in the range of about 7 to 17 or more; however, where all the advantages of the invention are not required or where there is present a high hydrogen chloride diluent, the carbon tetrachloride to methane ratio may be lower. Where hydrogen chloride is the major diluent, the reaction mixture may contain at least 60% by volume thereof.

The hydrocarbon reactants may be typified by methane, ethane, propane, propylene, ethylene, butanes, and butenes. The mol ratio of hydrocarbon to chlorine may be such that the reaction mixture contains from about 0.2 to about 0.7 atoms of carbon per mol of chlorine, desirably 0.2 to 0.6 and preferably 0.24 to 0.55. The residence time of the reaction mixture in the reaction zone may be in the range of about 0.1 to 45 seconds, based on the volume of the reaction zone and the gases at 25° C. and atmospheric pressure. The reaction may be conducted at pressures slightly above atmospheric; however, higher or lower pressure may be used, e. g., 0.1 to about 20 atmospheres or more gage.

The process of the invention may be operated in a continuous maner with minimum operational difficulty in view of the minimized formation of undesirable by-products such as hexachlorbenzene or hexachlorethane or deposition of carbon.

In view of the foregoing disclosures, variations and modifications thereof will be apparent to one skilled in the art and it is intended to include within the invention all such variations and modifications except those which do not come within the scope of the appended claims.

I claim:

1. In a process for the preparation and recovery of chlorinated hydrocarbons and hydrogen chloride by the thermal chlorination of an organic reactant of the class consisting of aliphatic hydrocarbons having 3 carbon atoms in the molecule, partial chlorination products of said aliphatic hydrocarbons, and mixtures thereof with chlorine in an amount of 1 mol of chlorine per about 0.2 to about 0.7 atoms of carbon contained in said organic reactant, said chlorination being carried out in the range of about 500 to 700° C., and recovering the desired products, the improvement of preheating the new feed rapidly substantially to reaction temperature by blending with hot reacted gases from said thermal chlorination, the volume ratio of hot reacted gases to new feed exceeding 1.

2. A process of claim 1 in which the organic reactant comprises propane and wherein perchloroethylene is recovered from the chlorination product.

3. A process of claim 1 wherein 2 to 6 volumes of hot reacted gas mixture are blended with new reactant feed.

References Cited in the file of this patent

UNITED STATES PATENTS

| | | |
|---|---|---|
| 2,249,922 | Vaughan et al. | July 22, 1941 |
| 2,374,933 | Harding | May 1, 1945 |
| 2,442,324 | Heitz et al. | May 25, 1948 |
| 2,643,272 | Lacomble et al. | June 23, 1953 |
| 2,688,642 | Partansky | Sept. 7, 1954 |

OTHER REFERENCES

B. I. O. S., Final Report 851, Item No. 22, Apr. 14, 1948, "Chlorinated Methane Derivatives," by Hochst.